United States Patent [19]

Brunskill et al.

[11] Patent Number: 5,582,786
[45] Date of Patent: Dec. 10, 1996

[54] METHOD OF PRODUCING FIBRE OR FILM

[75] Inventors: William Brunskill, Hinckley; John F. Carefull; Paul J. Akers, both of Coventry, all of United Kingdom

[73] Assignee: Courtaulds Fibres Limited, London, United Kingdom

[21] Appl. No.: 381,833

[22] PCT Filed: Aug. 18, 1993

[86] PCT No.: PCT/GB93/01753

§ 371 Date: Feb. 7, 1995

§ 102(e) Date: Feb. 7, 1995

[87] PCT Pub. No.: WO94/04724

PCT Pub. Date: Mar. 3, 1994

[30] Foreign Application Priority Data

Aug. 19, 1992 [GB] United Kingdom ............... 9217599.1

[51] Int. Cl.⁶ .......................... B29C 47/00; B32B 31/30; D01D 5/04; D02G 3/02
[52] U.S. Cl. .......................... 264/103; 264/143; 264/146; 264/171.13; 264/205; 264/210.4; 264/210.8; 264/211.13; 264/211.14; 264/211.17; 264/211.2; 264/232; 264/236; 427/379
[58] Field of Search ............................. 264/103, 143, 264/146, 171.13, 205, 210.4, 210.8, 211.13, 211.14, 211.17, 211.2, 232, 236; 427/379

[56] References Cited

U.S. PATENT DOCUMENTS

| 4,731,067 | 3/1988 | Le-Khac . |
|---|---|---|
| 4,861,539 | 8/1989 | Allen et al. . |
| 4,880,868 | 11/1989 | Le-Khac . |
| 4,962,172 | 10/1990 | Allen et al. . |
| 4,997,714 | 3/1991 | Farrar et al. . |
| 5,147,956 | 9/1992 | Allen . |

FOREIGN PATENT DOCUMENTS

| 0268498 | 5/1988 | European Pat. Off. . |
|---|---|---|
| 0269393 | 6/1988 | European Pat. Off. . |
| 0342919 | 11/1989 | European Pat. Off. . |
| 0397410 | 11/1990 | European Pat. Off. . |
| 2355929 | 1/1978 | France . |
| WO92/19799 | 11/1992 | WIPO . |
| WO93/25735 | 12/1993 | WIPO . |
| WO93/24684 | 12/1993 | WIPO . |

*Primary Examiner*—Leo B. Tentoni
*Attorney, Agent, or Firm*—Howson and Howson

[57] ABSTRACT

A water-absorbent water-insoluble fibre or film is produced by extruding an aqueous solution of a water-soluble polymer into a gaseous medium to form fibre or film. The extruded fibre or film is collected at a moisture content of 8 to 25% based on the dry weight of the fibre or film and is further dried at a temperature no greater than 100° C. before crosslinking the fibre or film at a temperature in the range 125° to 250° C. to a degree sufficient that the crosslinked fibre or film is water-insoluble. The fibre or film entering the crosslinking step has a moisture content which is reduced, preferably by at least 5%, and which is in the range 0 to 10%. Heat-crosslinked fibre is preferably treated with moist air after crosslinking to raise the moisture content of the fibre to at least 10%, particularly if the fibre is for textile processing. Water-absorbent water-insoluble coatings can be produced by a similar process.

22 Claims, 1 Drawing Sheet

METHOD OF PRODUCING FIBRE OR FILM

FIELD OF THE INVENTION

This invention relates to methods of producing water-absorbent shaped articles such as fibre or film, including free-standing film and film coated on a surface.

It is known to produce fibre or film of polymeric material which is capable of absorbing large quantities of water or other liquids. One method of manufacturing such fibre or film is to use as a starting material a water-soluble polymer which can be crosslinked under the action of heat. The polymeric material is dissolved in water to form an aqueous solution which is then extruded into a heated gaseous environment. This produces fibre or film of the water-soluble polymer, which is dried by the heated gaseous environment into which the material is extruded. The extruded fibre or film is subsequently heated to crosslink the polymer to such a degree that it is water-insoluble but water-absorbent.

Without the crosslinking step the fibre or film will redissolve should it ever encounter water subsequently. The crosslinking step, therefore, stabilises the fibre or film so that on encountering water it absorbs the water without dissolving. The more the material is heated and crosslinked the less capable the product is of absorbing water, but in general terms the more stable the material is and the more it retains its structure on absorbing water, that is to say the more the fibre retains its fibrous nature. The exact amount of crosslinking and heating can be varied depending upon the uses to which the water-absorbent fibre or film is to be put.

BACKGROUND ART

EP-A-268498 describes a water-absorbent water-insoluble polymeric fibre, film, coating, bonding layer or foam, made by forming a substantially linear polymer by polymerisation of water-soluble ethylenically unsaturated monomer blends comprising carboxylic and hydroxylic monomers and then reacting the carboxylic and hydroxylic monomers in the linear polymer to form internal crosslinks within the polymer.

EP-A-269393 describes a water-absorbent water-insoluble crosslinked polymer fibre or film made by dry extrusion of a solution of a substantially linear polymer formed from a water-soluble blend of monoethylenically unsaturated monomers comprising a plasticising monomer, evaporating the solvent and forming polymeric fibre or film plasticised by an external plasticiser, stretching the fibre or film while the external plasticiser remains in the fibre or film, and then crosslinking the polymer.

EP-A-342919 describes film or fibre made by extrusion and stretching from a polymer of water-soluble ethylenically unsaturated monomers that include ionic monomer. A counterionic lubricant compound is absorbed into the surface of the fibre or film before or during the stretching.

EP-A-397410 describes a water-soluble linear polymer of carboxylic acid monomers such as acrylic acid and a hydroxylic monomer which can be crosslinked, after being shaped by extrusion of an aqueous solution of the polymer as fibre or film, to form crosslinks between the carboxyl and hydroxyl groups.

FR-A-2355929 describes a process for manufacturing yarns and fibres having a water-retention capacity of more than 80% by weight, in which process aqueous solutions containing water-soluble polymers of acrylic acid, distributed homogeneously, and aliphatic, cycloaliphatic, araliphatic or aromatic compounds that contain at least two hydroxyl and/or primary or secondary amino groups in their molecule are spun, and the yarns spun in this way are heated at temperatures of between 100° and 200° C.

DISCLOSURE OF THE INVENTION

According to one aspect of the present invention, a method of producing water-absorbent water-insoluble fibre or film, by extruding an aqueous solution of a water-soluble polymer into a gaseous medium to form fibre or film and crosslinking the fibre or film at a temperature in the range 125° to 250° C. to a degree sufficient that the crosslinked fibre or film is water-insoluble, is characterised in that the extruded fibre or film is collected at a moisture content of 8 to 25% based on the dry weight of the fibre or film and is further dried at a temperature no greater than 100° C. so that the fibre or film entering the crosslinking step has a lower moisture content in the range 0 to 10% based on the dry weight of the fibre or film.

The conventional way of processing the fibre or film to crosslink the polymer would be to collect the fibre or film at a moisture content at which the fibre or film is no longer self-adherent and then to heat the fibre or film at a temperature in the range 125° to 250° C. to cause crosslinking. It has unexpectedly been found according to the invention that, if the fibre or film is dried at a temperature no greater than 100° C. after collection but before passing into the crosslinking zone, then a material with reduced cracking or crazing at the fibre or film surface can be obtained, which material is tougher in the sense that it is less prone to damage during subsequent textile processing such as carding and crimping of fibre and is less likely to shed fine particles during any form of further handling. This is surprising, since the fibre or film will in any event be dried as it is heated during the crosslinking stage.

Preferably, the water-soluble non-crosslinked polymer is substantially linear and is formed from a water-soluble blend of monoethylenically unsaturated monomers that must be selected such that the final crosslinked polymer is water-absorbent. Ways of selecting monomers for this purpose are known, for example from EP-A-397410 mentioned above. Preferably, the water-soluble blend of monoethylenically unsaturated monomers includes an anionic monomer, for example it comprises 50 to 95% by weight ethylenically unsaturated carboxylic monomer and 5 to 50% by weight copolymerisable ethylenically unsaturated monomer. The copolymerisable monomer preferably comprises mainly a non-ionic monomer. The monomers used in the invention are preferably acrylic monomers.

Preferred carboxylic monomers are methacrylic acid or acrylic acid, but maleic acid or anhydride, itaconic acid or any of the other conventional ethylenically unsaturated carboxylic acids or anhydrides are also suitable. Some of the carboxylic monomer units in the copolymer can optionally be replaced by monomer units derived from an ethylenically unsaturated sulphonic acid such as 2-acrylamido-2-methyl-propane sulphonic acid or allyl sulphonic acid. Carboxylic and sulphonic monomers may be present in the final polymer in free acid or water-soluble salt form, suitable salts being formed with ammonia, an amine or an alkali metal.

When the crosslinking reaction involves reaction with the carboxylic acid groups it is usually preferred that at least some of the carboxylic acid groups should be present as free acid groups before the crosslinking occurs. For instance, for this purpose, it may be adequate for 10 to 75%, preferably 25 to 75%, of the acid groups to be in free acid form before the crosslinking occurs.

The copolymerisable ethylenically unsaturated monomer for copolymerisation with the carboxylic monomer may be a water-soluble ethylenically unsaturated monomer such as acrylamide or a water-insoluble monomer, for example an olefin, such as isobutylene, an aromatic ethylenically unsaturated monomer, such as styrene or a substituted styrene, an alkyl ester of acrylic or methacrylic acid, such as methyl or ethyl acrylate or methacrylate, butyl acrylate or methacrylate or 2-ethylhexyl acrylate or methacrylate, vinyl acetate or acrylonitrile. One or more copolymerisable monomers may be present. A monomer that will provide groups for internal crosslinking with the carboxylic groups (as discussed below) is usually included. Other non-ionic monomers that may be used include ethylenically unsaturated monomers that carry a pendent group of the formula $-A_mB_nA_pR$ where B is ethyleneoxy, n is an integer of at least 2, A is propyleneoxy or butyleneoxy, m and p are each an integer less than n and preferably below 2 and most preferably zero, and R is a hydrophobic group containing at least 8 carbon atoms, as described in more detail in EP-A-213799. The comonomer(s) are generally present in amounts of at least 5% and preferably at least 10% by weight based on the monomers used for forming the copolymer, and they may be present in amounts up to about 50%, generally below 45%, by weight.

The substantially linear water-soluble polymer may be formed from the monomer blend in any conventional manner. It may be preformed and then dissolved to form a polymer solution. For instance, it may be made by reverse-phase polymerisation if the monomer blend is soluble in water or by water-in-oil emulsion polymerisation if the blend is insoluble in water, e.g. at a low pH. However, this can incur the risk that the polymer may be contaminated by surfactant, and this is undesirable. Preferably, therefore, the polymer is made by aqueous solution polymerisation or other solution polymerisation methods. Generally, it is formed by solution polymerisation in the solvent in which it is to be extruded (usually water). The polymerisation can be conducted in a conventional manner in the presence of conventional initiators and/or chain-transfer agents to give the desired molecular weight.

The concentration of polymer in the aqueous solution to be extruded is generally in the range 5 to 50% by weight and will be selected, having regard to the molecular weight of the polymer, so as to give a solution having a viscosity that is convenient for extrusion. The concentration of polymer is usually at least 15% by weight, with values of 30% to 45%, e.g. 35% to 40%, by weight often being particularly suitable.

The solution that is extruded may have a viscosity as low as, for instance, 20,000 mPa.s at 20° C. but generally the viscosity is at least 50,000 and usually at least 80,000 and sometimes as high as 200,000 mPa.s, as measured at 20° C. using a Brookfield RVT spindle 7 at 20 rpm. The viscosity desirably is also relatively high at the extrusion (spinning) temperature, which typically is elevated, for instance above 80° C. but below the boiling point of the polymer solution. The solution at 80° C. usually has a viscosity of at least 5,000 or 10,000 mPa.s and most preferably at least 20,000 mPa.s. For instance, it may be in the range 50,000 to 100,000 mPa.s. These values may be obtained by extrapolation from values obtained using a Brookfield RVT viscometer spindle 7 at 20 rpm at a range of temperatures below 80° C.

The solvent of the solution that is extruded is generally water alone but it can be a blend of water and organic solvent, for example methanol. The solvent must be volatile so as to permit rapid evaporation after extrusion. The gaseous environment into which the solution is extruded is preferably hot air. When forming fibre, the polymer is extruded through a spinneret, which can be of the type conventionally used in synthetic fibre production, and the hot air can be contained in a cell of the type conventionally used for dry spinning. The extruded fibre can be taken up on conventional textile machinery, such as a godet, as a yarn or tow. A conventional spin finish, which is preferably non-aqueous, is usually applied to the fibre before it is taken up.

The moisture content of the fibre at the point at which it is taken up is generally in the range 8 to 25% based on the dry weight of fibre. The fibre at this point preferably has a moisture content of at least 10%, most preferably at least 12%, by weight, particularly if the fibre has to be handled mechanically before it passes to the drying step. If the fibre is dried to a moisture content less than 8% before collection, it has decreased mechanical strength and in particular is brittle. It may not withstand processes such as cutting, crimping or cross-laying to form a web. The moisture content of the fibre is preferably no higher than 22%, based on the dry weight of fibre, to avoid fibres sticking together if they are collected on a package. A moisture content of at least 15% and no more than 20% is particularly advantageous.

When forming film, the aqueous solution can for example be extruded via a slit die or an annular die through a heated gaseous environment, generally hot air, on to a support surface, for example a heated rotary drum. The support surface has release properties. Drying of the film continues on the drum, and the film is stripped from the drum and taken up on rolls. The moisture content of the film as it is taken up is generally in the range 8 to 25% based on the dry weight of film, preferably 10 to 22%, most preferably 12 to 20%.

It is preferred to stretch the fibre or film before it is collected. Stretching is effected by having the speed of the collection apparatus, for example the take-off godet, higher than the extrusion rate of the polymer solution (the linear velocity of the polymer solution through the exit capillary of the spinneret or die). The ratio of the take-off speed to the extrusion speed is generally up to 10:1 but is preferably in the range 2:1 to 8:1, most preferably 3:1 to 6:1.

The diameter of the fibre as it is collected preferably corresponds to a weight of not more than 20 decitex per filament, for example in the range 2 to 15 decitex per filament.

The fibre or film thus taken up is further dried to a moisture content in the range 0 to 10%, preferably 4 to 8%, based on the dry weight of fibre or film. The degree of drying carried out in this further drying step is preferably such as to reduce the moisture content of the fibre or film by at least 5% based on the dry weight of fibre or film. Drying is carried out at a temperature no greater than 100° C. to avoid damage to the fibre or film by the formation of bubbles of superheated steam within the fibre or film structure. Drying is preferably carried out by passing the fibre or film through an oven, generally at a temperature of above 50° C., for example at a temperature in the range 60° to 90° C.

If any mechanical process step needs to be carried out on the fibre or film, it may be advantageous to do it before the further drying step while the fibre or film has a moisture content of at least 8%, preferably at least 10 or 12%, to 25%, preferably not more than 22%, based on the dry weight of fibre or film, most preferably 15 to 20%. Examples of such mechanical process steps are crimping of fibre, stretching of fibre or film, cutting of fibre into staple fibre, pneumatic conveying, fibre blending, crosslaying of fibre to form a batt or slitting of film longitudinally to form tapes. For example, the fibre can be cut into staple fibre and dried as a bed of staple fibre on a foraminous support, preferably a moving belt; alternatively, continuous fibre can be cross-laid on a foraminous belt to form a batt and dried in that form. Alternatively, mechanical treatment can be carried out during the further drying step. For example, a film can be dried while being stretched on a stenter.

In the crosslinking step, the water-soluble polymer is heated to cause crosslinking of the polymer chains sufficient to render the polymer water-insoluble. The crosslinking can be effected by reaction into the backbone of the water-soluble polymer but preferably is effected by crosslinking through pendent groups provided by one or more of the monomers that have been polymerised to form the water-soluble polymer. The crosslinking preferably comprises the formation of ester, amide (or imide) or urethane groups by reaction of pendent carboxylic acid groups in the water-soluble polymer after extruding the polymer. Formation of ester groups is preferred.

Preferably, the polymer is internally crosslinked by reaction between reactive groups within the extruded polymer. Usually, the carboxylic groups act as one type of reactive group and are reacted with hydroxyl, epoxide, amino or blocked isocyanate groups. Particularly preferred systems are described in detail in EP-A-268498. In these systems the extruded polymer is formed from a monomer blend comprising monomer that provides carboxylic acid monomer groups and monomer that provides hydroxyl groups that can react with the carboxylic acid groups to form ester crosslinks that contain only carbon and oxygen atoms in the linkages, and these carboxylic and hydroxyl groups are reacted after extrusion to form the said crosslinks. Generally, the carboxylic acid groups are provided by acrylic acid or methacrylic acid and the hydroxyl groups are provided by allyl alcohol, an epoxide-substituted vinyl monomer such as glycidyl methacrylate or a hydroxyalkyl ester of a vinyl carboxylic acid such as 2-hydroxyethyl acrylate, 2-hydroxyethyl methacrylate, 2-hydroxypropyl methacrylate or 3-hydroxypropyl methacrylate, or by vinyl alcohol groups. Alternative hydroxyl group-containing monomers are those of the formula $CHR^1=CR_2—Y—M_a—OH$ where $R^1$ is hydrogen or carboxyl, $R^2$ is hydrogen or methyl, Y is O, $CH_2O$ or COO, M is alkyleneoxy, for example ethyleneoxy or 1,2-propyleneoxy, and a is an integer greater than 1 and preferably at least 5, as disclosed in EP-A-397410. Alternatively, the comonomer can contain a primary or secondary amino group, for example 2-aminoethyl methacrylate, which reacts to form an amide crosslink, or it can contain an isocyanate group (which may need to be blocked to prevent crosslinking during extrusion), for example 2-isocyanatoethyl methacrylate, to form urethane crosslinks.

Alternatively, reaction may be with an external crosslinking agent which should be substantially non-volatile at the temperatures reached in the extrusion process. Various systems for externally crosslinking the copolymer are described in EP-A-269393 and FR-A-2355929 and these can be used in the present invention. For example, a hydroxy-functional or carboxyl-functional linear polymer can be crosslinked by a diisocyanate (which may need to be blocked) or a carboxy-functional polymer can be crosslinked by a polyamine such as ethylene diamine or by a polyfunctional reagent containing hydroxyl and/or epoxide groups.

The temperature used to crosslink the fibre or film is generally in the range 125° to 250° C. When forming ester crosslinks by the reaction of carboxylic acid and hydroxyl groups, the preferred temperature of crosslinking is at least 150° C. or 160° C. and is preferably no higher than 225° C. The temperatures reached during the extrusion process, for example the temperature reached by filaments during dry spinning, are lower than the crosslinking temperature, preferably at least 30° C. lower, to prevent premature crosslinking; when forming ester crosslinks, the temperature reached during the extrusion process is preferably no higher than 120° C. The time for which the crosslinking step is carried out is generally in the range 2 minutes to 2 hours; crosslinking times of 5 to 15 minutes are preferred unless the temperatures required to effect crosslinking in this time might damage any chemical materials present in the fibre or film. The apparatus used for heat-crosslinking can in general be similar to that used for drying, for example the fibre or film can be passed through an oven. Fibre is preferably crosslinked as a bed of fibre on a porus support such as a foraminous conveyor belt.

The moisture content of the fibre or film as it enters the heat zone used for crosslinking is in the range 0 to 10% based on the weight of fibre or film. We have found that, if the moisture content of the fibre or film is above 10% at this stage, damage to the structure of the fibre or film is caused by the rapid vapourisation of moisture at the high temperatures used for crosslinking. In general, the strength of the fibre produced increases with a decreasing moisture content of the fibre or film on entering crosslinking. Decreasing moisture content leads to fibre or film of improved mechanical properties down to a moisture content of 4 or 5%. Thus, in the most preferred method of carrying out the invention, fibre is dry spun and collected at a moisture content of 15 to 20% based on the dry weight of fibre, is crimped and/or cut as required and is dried to a moisture content of 4 to 8% before entering the crosslinking step. However, if the fibre is initially collected at a moisture content of 10 to 12%, it is still advantageous to dry the fibre to a moisture content of 3 to 6% before entering crosslinking; similarly it is advantageous to dry from a moisture content of 15 to 20% down to 10% before crosslinking, although drying to a lower level will give further improvement in fibre quality. In general, there is little extra advantage in drying to a moisture content of below 4%, and particularly below 2%, compared to the extra cost of removing these low levels of moisture in a drying step carried out at below 100° C.

The fibre or film emerging from the crosslinking step has a very low moisture content, generally less than 1%, because of the high temperatures used in crosslinking. For some uses, particularly for fibre which is to undergo further textile processing, we have found it advantageous to add moisture in a controlled manner after crosslinking, for example to increase the moisture content to a value of at least 10%, and generally up to 30%, for example 10 to 20%, based on the dry weight of fibre, to give a less brittle fibre.

Thus, according to another aspect of the invention a method of producing crosslinked fibre by spinning a crosslinkable polymeric material to form fibre and crosslinking the fibre at a temperature greater than 100° C. is characterised in that the crosslinked fibre is treated with moist air after crosslinking to raise the moisture content of the fibre to at least 10% based on the dry weight of the fibre.

Treatment of the fibre can be carried out with moist air at ambient temperature but is preferably carried out with moist air at an elevated temperature of at least 40° C., preferably at least 50° C., up to a temperature of about 90° C. The moist air should have a relative humidity greater than the moisture content desired on the fibre and can have a relative humidity of up to 100%, although when using moist air at elevated temperature the relative humidity is preferably in the range 40 to 75%. Treatment with moist air is preferably carried out by passing a bed of fibre on a support, preferably a porous support, such as a foraminous conveyor belt, through a chamber having a flow of air at the required temperature and humidity. The moist air is preferably passed through the bed of fibre to achieve uniform treatment of the fibre. Exposure of a package of fibre to moist air will not in general achieve uniform moistening of the fibre.

Such treatment to increase the moisture content of the fibre is preferably carried out when the fibre is to be subjected to textile processing, for example carding, yarn spinning, crimping, weaving or knitting or non-woven fabric formation involving mechanical treatment such as needling. Fibre intended for such processes usually has a staple length of at least 10 mm, and frequently at least 25 mm, up to a staple length of 100 or 200 mm, or it may be in the form of continuous filaments.

For many uses fibre produced according to the invention is formed into a web by air laying or wet laying. In particular, air laying, from a suspension of fibres in air onto a porous mesh having suction means below the mesh, is a widely used and inexpensive process for forming a fibrous web for use in disposable absorbent products. The fibrous web can be bonded by adhesive. For use in such nonwoven web-forming processes, remoistening of the fibre is not essential, although it can be carried out without detriment to the product. The use of a drying step at less than 100° C. before crosslinking is still advantageous in producing a fibre having less surface damage.

The remoistening step has a more marked effect in reducing brittleness, and hence in reducing fibre loss during textile processing than the drying step at less than 100° C. before crosslinking. Although the best results for textile processing are obtained from a process in which both these steps are used, the remoistening step can also be used in a process where crosslinking is carried out without a pre-drying step. In this case the moisture content of the fibre as it is collected and fed to the crosslinker is preferably less than 15% based on the dry weight of fibre, for example 8 to 12%.

According to another aspect of the invention a water-absorbent water-insoluble coating is produced by a process in which a flexible substrate such as a film or fabric is coated with an aqueous solution of a crosslinkable water-soluble polymer, the coating is dried, generally at a temperature of above 100° C., to a moisture content of 8 to 25% by weight and then further dried at a temperature no greater than 100° C. to a lower moisture content in the range 0 to 10% by weight, and the further dried coating is crosslinked by heating at a temperature in the range 125° to 250° C. The coated film or fabric can be mechanically treated, for example wound on a package, stretched and/or cut, between the two drying steps. The crosslinkable water-soluble polymer used can be as described above for use in preparing fibre or film, and it can be coated on the flexible substrate as an aqueous solution of similar concentration and viscosity.

BRIEF DESCRIPTION OF DRAWING

The single FIGURE of the accompanying drawing is a schematic diagram of the integers for a process for dry spinning, collecting, cutting, drying, crosslinking and remoisturising fibre according to the invention.

The invention will now be described by way of example with reference to the drawing. A heated and filtered spinning dope is extruded through a spinneret 10 to form fibre 11 in a dry spinning cell 13. Hot air circulates in the cell 13. The extruded fibre 11 is dried and solidified as it passes down the cell 13 and is collected around a godet 15. The fibre emerges from the side of the drying chamber of the cell 13, through a small hole 16, in the form of a tow 17.

Figure 1:
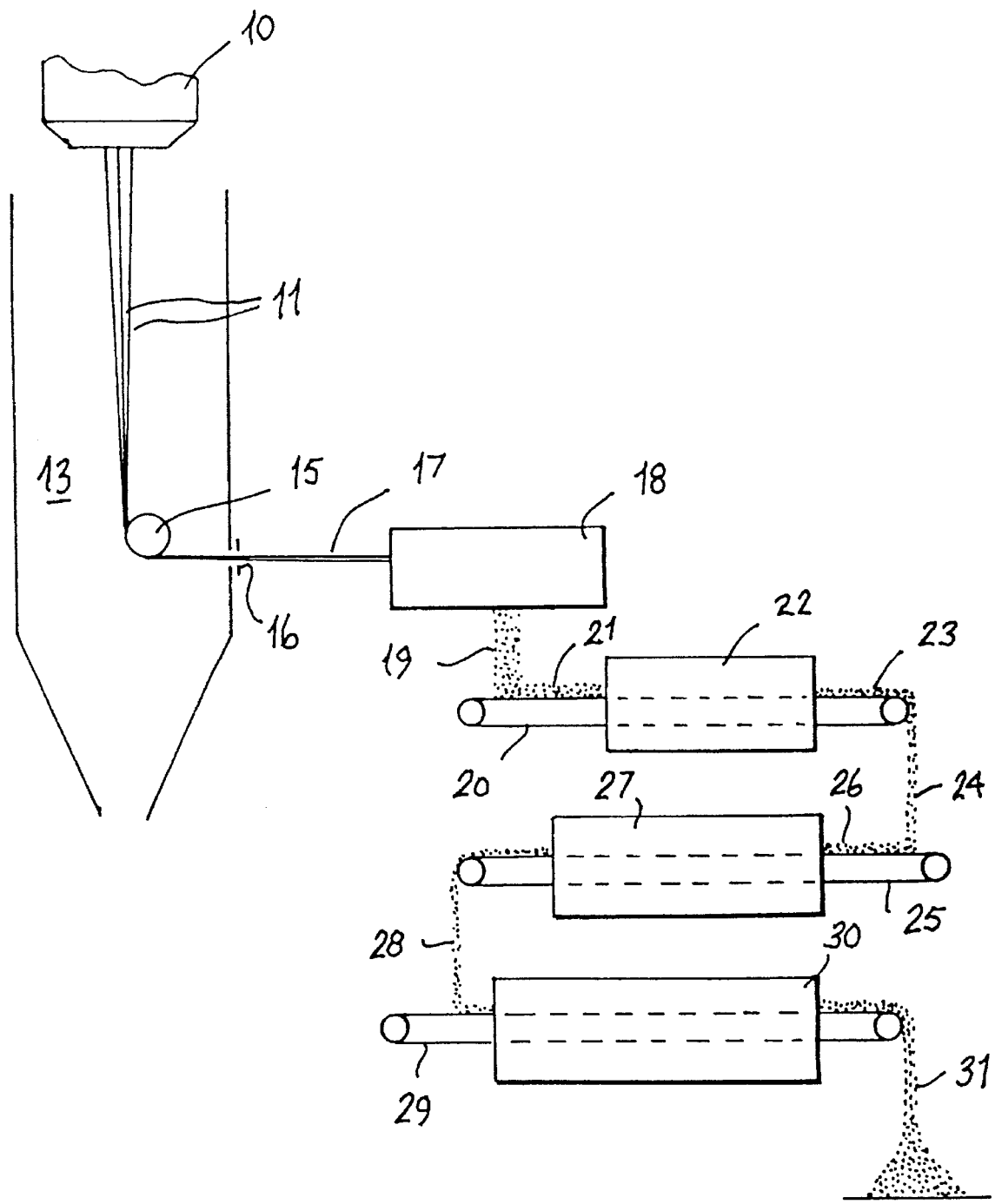

The moisture content of the fibre emerging at 16 in the form of a tow is 8 to 25 per cent based on the dry weight of fibre. If required, a spin finish can be applied to the fibre strands as they are emerging in the form of the tow 17.

The tow 17 passes into a conventional staple cutting machine 18 and falls from the cutter as staple fibre 19. Examples of staple fibre which have been processed are 6 mm and 52 mm fibre, although shorter and longer fibres, as well as fibres of intermediate length, benefit from the process of the invention. The staple fibre 19 falls onto a moving air-permeable belt 20 and forms a bed 21 of fibre having a moisture content in the range 8 to 25 per cent. The staple fibre 19 can alternatively pass to a feed hopper arranged to give a controlled supply of fibre to the belt 20 passing through a predrying oven 22. The fibre can for example be pneumatically conveyed from the cutter 18 to a hopper positioned above the belt 20. The hopper can be of a type (known in fibre handling) in which a pair of fluted rollers rotate so as to withdraw fibre from the hopper and feed the fibre onto the belt 20. To enhance uniform distribution of the fibre in the bed 21, the fibre can be fed to the belt 20 as a loose web rather than as separate piles of fibre. To this end, a narrow hopper is preferably used, and an inclined plate may be positioned below the fluted rollers to direct the loose web more gently onto the belt 20. A guide roll at a fixed distance above the belt 20 and/or a downwardly biased flap at the entry to the oven 22 can be used to help to control the depth of the fibre bed 21. The depth of the fibre bed 21 is preferably in the range 10 to 50 mm having a weight of 1 to 5 kg/m$^2$.

The fibre bed 21 is passed through the predrying oven 22, where it is dried at a temperature of no more than 100° C., for example 80° C., for a time sufficient to give a moisture content of 0 to 10 per cent, for example about 5 per cent. The oven 22 is preferably a forced air oven in which a downwards draught of hot air impinges on the fibre bed 21 and passes through the fibre bed 21 and the permeable belt 20. The residence time in the oven 22 can for example be in the range from 6 to 50 minutes.

The dried fibre emerges from the oven 22 at exit 23, which preferably has means for preventing fibre from being blown out of the dryer into the atmosphere. The exit 23 can for example be formed with a downwardly biased flap of a flexible impermeable material, for example that sold under the Trade mark TYGAFLOR, which extends for several decimeters along the belt 20 following the exit 23 from the oven 22. Air escaping at the exit 23 is forced into the fibre bed 21 and eventually through the porous belt 20, tending to hold the fibre on the belt 20. The layer of dried fibre falls from the belt 20 in a stream 24 onto a second permeable conveyor belt 25. The fibre can alternatively fall into or be conveyed to a hopper feeding the belt 25, or a single conveyor belt can pass through the predrying oven 22 and the subsequent crosslinking oven.

The predried staple fibre forms a bed 26 on the conveyor 25. The bed 26 of fibre may be of the same thickness and weight as the bed 21 of fibre on the belt 20, or it may be somewhat thinner, for example in the range 0.8 to 3.5 kg/m$^2$. The bed 26 of fibre is then passed through a crosslinking oven 27 where the predried staple fibre is heated at a temperature in the range 125° to 250° C., for example at 200° C. for 8 minutes, to crosslink the water-soluble polymer to form the absorbent fibre.

The crosslinking oven 27 is preferably a forced air oven of a similar type to the predrying oven 22, with similar means for preventing loose fibre from being blown out of the oven. After crosslinking, the absorbent fibre is fed from the conveyor 25 as at 28 onto a further conveyor 29, which is preferably a permeable belt similar to the conveyors 20 and 25. The fibre can alternatively be fed to a hopper, feeding conveyor 29, or a single conveyor belt can pass through the crosslinking oven and the subsequent remoisturising chamber.

On the conveyor 29 the bed of fibrous absorbing material is passed through a remoisturising chamber 30 where the moisture content of the fibre is increased to at least 10 per cent, for example approximately 15 per cent. The remoisturising chamber 30 preferably has a downwards draught of moist warm air, for example at 50% relative humidity and 65° C., impinging on the fibre bed. The chamber can be of similar construction to the ovens 22 and 27. The residence time in the remoisturising chamber 30 can for example be in the range from 3 to 45 minutes. The remoisturised fibre is then passed off the conveyor 29 as at 31 to suitable storing and/or packaging equipment.

INDUSTRIAL APPLICABILITY

The water-absorbent water-insoluble fibre or film of the present invention can be used in various products. The fibre can, for example, be used in absorbent personal products such as tampons, disposable diapers, sanitary napkins or incontinence pads. The absorbent fibre is preferably used in combination with other fibres, for example cellulosic fibre such as cotton or regenerated cellulose fibre, including multi-limbed cellulose fibre as described in EP-A-301874, or polypropylene or polyester fibre. The absorbent fibre can be intimately mixed with said other fibre, for example by carding or air-laying the fibres together to form a web of mixed fibres. Alternatively, the absorbent fibre can be used as a layer, for example a non-woven fabric, of absorbent sandwiched between layers of other fibre. An absorbent film produced according to the invention can similarly be used as an absorbent sandwiched between fibrous layers. The proportion of absorbent fibre in a blend with cellulosic fibre for absorbent products can for example be at least 5% and up to 95% by weight, preferably at least 10% and up to 50% by weight. The absorbent fibre can also be used at similar levels in conjunction with fluffed wood pulp or synthetic fibre pulp, for example polyolefin pulp, in absorbent products.

A yarn, woven fabric or nonwoven fabric comprising the absorbent fibre, or an absorbent film produced according to the invention, can be used as a swellable material which prevents ingress of water in underground cables. A yarn or fabric tape can be used to wrap cable or can be laid longitudinally in the cable.

The absorbent fibre or film can be used in many other applications of the types described in Research Disclosure. January 1992 at pages 60–61, for example in filters, absorbent liners or mats for packaging, disposable wipes, s mats, shoe insoles or bed sheets, swellable gaskets or seals, moisture- retention mats in horticulture, moisture-retaining packaging or swellable self-sealing stitching threads.

The invention is illustrated by the following Examples, in which parts and percentages are by weight unless otherwise stated:

EXAMPLE 1

A 38% aqueous solution of a copolymer of 78 mole % acrylic acid (75% neutralised as sodium salt), 20 mole % methyl acrylate and 2 mole % hexapropylene glycol monomethacrylate was spun into fibre through a spinneret into a cell where water was evaporated from the fibre. The temperature of the solution at the spinneret was between 90° and 100° C. The cell was heated by tube wall heaters at 150° C. The fibre was collected as a tow at approximately 200 m/min and was passed to a staple cutter. The fibre had a moisture content of 16% based on dry fibre as it passed to the staple cutter and a weight per filament of approximately 15 dtex.

The fibre was cut to a length of 160 mm and was dried in a forced air oven at 70° C. to a moisture content of 7% based on dry fibre. The dried fibre was then crosslinked in an oven at 200° C. for 10 minutes to form a water-absorbent water-insoluble fibre. The fibre was then conditioned at 60° C. and 50% relative humidity for 8 hours to a moisture content of 15% based on dry fibre.

The fibre produced had a free swell absorbency of 50 g/g with a retention under load of 35 g/g.

In the free swell absorbency test 0.5 g fibre is dispersed in 30 ml 0.9% aqueous saline solution and left for 5 minutes. The dispersion is then filtered through a sintered Mark 1 funnel of pore size 100–160 microns and is left for 5 minutes or until it stops dripping, whichever is the longer. The amount of water filtered through the funnel is weighed and the weight of saline solution absorbed by the fibres is calculated by subtraction.

Following the above test, the retention under load is measured by application of pressure at about 3.4 kPa for 5 minutes or until dripping stops, whichever is the longer, and weighing the saline solution expressed. The weight of saline solution retained by the fibres is calculated by subtraction.

For comparison, a control fibre was produced in the same way except that the drying step was omitted. Each fibre sample was blended in equal proportions with 10 dtex 153 mm polyester staple fibre and processed through semi-worsted carding and filling equipment to produce a sliver with a weight of 11.5 g/m. The amount of short, broken fibres deposited under the card and on the surfaces after the exit nips from the card and the filling equipment was significantly less with the fibre produced according to the invention than with the control fibre.

EXAMPLE 2

The process of Example 1 was repeated, except that the remoistening step after crosslinking the fibre was carried out by treating the fibre as a fibre bed on a porous belt in a remoisturising chamber which was a forced air oven having a downdraught of air at a temperature of 60° C. and 55% relative humidity. The remoistening step was carried out for 8 minutes and a fibre moisture content of 15% was achieved. The fibre had the same absorbency and textile processing properties as the fibre of Example 1.

EXAMPLE 3

Fibre was produced by dry spinning an aqueous copolymer solution as described in Example 1 and collecting the fibre as tow at a moisture content of 15%. The tow of 15 dtex filaments was cut to a staple length of 6 mm. The staple fibre was dried at 70° C. to a moisture content of 7% and crosslinked at 200° C. for 10 minutes as described in Example 1, but was not remoistened.

The dry fibre was suspended in air and deposited on a papermaking wire mesh above suction plates to form an air laid fabric useful as an absorbent layer in diapers.

For comparison, a control fibre was produced in the same way except that the drying step was omitted. When the control fibre was air laid, significantly more fragments of fibre were found in the air sucked through the mesh than when the fibre of the invention was air laid.

EXAMPLE 4

Fibre was produced by dry spinning the aqueous copolymer solution of Example 1 in a longer cell so that more drying of the freshly extruded fibre took place. The fibre was collected at a moisture content of 11% and was cut to a staple length of 160 mm. The fibre was then crosslinked in an oven at 200° C. for 10 minutes without any pre-drying step. The fibre was remoistened using the process of Example 2 at a temperature of 65° C. and 50% relative humidity to achieve a final moisture content of 16%.

When the fibre was blended with polyester staple and carded to form a sliver as described in Example 1, the amount of broken fibres deposited under and around the card was slightly greater than with the fibre of Example 1, but significantly less than with the control fibre of Example 1. There was also more short, broken fibre produced at the staple cutter than in Example 1.

By comparison, when the remoistening process was omitted the amount of short fibres deposited under and around the card was very much greater.

We claim:

1. A method of producing water-absorbent water-insoluble fibre or film by extruding an aqueous solution of a water-soluble polymer into a gaseous medium to form fibre or film and crosslinking the fibre or film at a temperature in the range 125° to 250° C. to a degree sufficient that the crosslinked fibre or film is water-insoluble, in which process the extruded fibre or film is collected at a moisture content of 8 to 25% based on the dry weight of the fibre or film and is further dried at a temperature no greater than 100° C. so that the fibre or film entering the crosslinking step has a lower moisture content in the range 0 to 10% based on the dry weight of the fibre or film.

2. A method according to claim 1 of producing water-absorbent water-insoluble fibre, in which process the aqueous solution of water-soluble polymer is extruded through a spinneret to form fibre and the fibre is collected as a tow or yarn at a moisture content of 10 to 22% based on the dry weight of fibre.

3. A method according to claim 2, wherein the fibre collected has a decitex per filament of 2 to 20.

4. A method according to claim 2, wherein the tow or yarn is cut into staple fibre at a moisture content of 10 to 22% based on the dry weight of fibre and is subsequently dried and crosslinked in fibrous form.

5. A method according to claim 4, wherein the staple fibre is dried as a bed of fibre on a moving belt.

6. A method according to claim 2, wherein the fibre is re-moisturised after crosslinking to a moisture content of at least 10% based on the dry weight of fibre.

7. A method according to claim 1 for the production of water-absorbent water-insoluble film, in which process the aqueous solution of water-soluble polymer is extruded through a slit die or annular die to form a film which is collected at a moisture content of 10 to 22% based on the dry weight of film.

8. A method according to claim 7, wherein the film is longitudinally slit at a moisture content of 10 to 22% based on the dry weight of film before the step of drying at a temperature no greater than 100° C.

9. A method according to claim 1, wherein the fibre is stretched before it is collected.

10. A method according to claim 1, wherein the extruded fibre or film is collected at a moisture content of at least 12% based on the dry weight of fibre or film.

11. A method according to claim 10, wherein the extruded fibre or film is collected at a moisture content of 15 to 20% based on the dry weight of fibre or film.

12. A method according to claim 1, wherein the extruded fibre or film is dried to a moisture content of 4 to 8% based on the dry weight of fibre or film at a temperature no greater than 100° C. before entering the crosslinking step.

13. A method according to claim 12, wherein the moisture content of the fibre or film is reduced by at least 5% based on the dry weight of fibre or film during the step of further drying at a temperature no greater than 100° C.

14. A method according to claim 1, wherein the said drying step is carried out at a temperature of 60° to 90° C.

15. A method according to claim 1, wherein the aqueous solution has a concentration of water-soluble polymer of 30 to 45% by weight and is extruded at a temperature which is above 80° C. but below the boiling point of the polymer solution.

16. A method of producing crosslinked fibre by spinning a crosslinkable polymeric material to form fibre and crosslinking the fibre at a temperature of between about 125° C. to about 250° C., in which process the crosslinked fibre is treated with moist air after crosslinking to raise the moisture content of the fibre to at least 10% based on the dry weight of the fibre, the moist air being passed through a bed of the crosslinked fibre on a porous support.

17. A method according to claim 16, wherein the moist air with which the crosslinked fibre is treated is at a temperature of at least 50° C.

18. A method according to claim 16 wherein the crosslinked fibre is a water-absorbent water-insoluble fibre produced by extruding an aqueous solution of a water-soluble crosslinkable polymer into a gaseous medium and crosslinking the fibre.

19. A method according to claim 1, wherein the water-soluble polymer is a copolymer of 50 to 95% by weight ethylenically unsaturated carboxylic monomer and 5 to 50% by weight copolymerisable ethylenically unsaturated monomer.

20. A method according to claim 19, wherein the copolymerisable ethylenically unsaturated monomer consists at least partly of hydroxy-functional or epoxide-functional comonomer so that ester crosslinks are formed by reaction between carboxylic acid groups derived from the carboxylic monomer and hydroxyl or epoxide groups derived from the comonomer during the crosslinking step.

21. A method of producing a water-absorbent water-insoluble coating on a flexible substrate, wherein a flexible substrate is coated with an aqueous solution of a crosslinkable water-soluble polymer, the coating is dried to a moisture content of 8 to 25% by weight, and then further dried at a temperature no greater than 100° C. to a lower moisture content in the range 0 to 10% by weight, and the further dried coating is crosslinked by heating at a temperature in the range 125° to 250° C.

22. A method of producing crosslinked fibre by spinning a crosslinkable polymeric material to form fibre and crosslinking the fibre at a temperature of between about 125° C. to about 250° C., in which process the crosslinked fibre is treated, after crosslinking, with moist air at a temperature of at least 50° C. to raise the moisture content of the fibre to at least 10% based on the dry weight of the fibre.

* * * * *